United States Patent [19]

Flaherty

[11] 4,283,079

[45] Aug. 11, 1981

[54] ULTRA HIGH VACUUM SEAL ARRANGEMENT

[75] Inventor: Robert Flaherty, Mt. Lebanon, Pa.

[73] Assignee: The United States of America as represented by the United States Department of Energy, Washington, D.C.

[21] Appl. No.: 891,675

[22] Filed: Mar. 30, 1978

[51] Int. Cl.² .......................................... F16L 13/14
[52] U.S. Cl. ................................ 285/381; 285/382.2; 285/397; 285/417; 285/422
[58] Field of Search ................. 285/381, 422, DIG. 5, 285/382.2, 382.4, 417; 29/447, DIG. 35; 174/DIG. 8

[56] References Cited

U.S. PATENT DOCUMENTS

| | | | |
|---|---|---|---|
| 3,174,851 | 3/1965 | Buehler | 75/170 |
| 3,513,429 | 5/1970 | Helsop | 285/381 X |
| 3,579,805 | 5/1971 | Kast | 285/381 X |
| 3,740,839 | 6/1973 | Otte et al. | 29/447 X |
| 3,759,552 | 9/1973 | Levinsohn et al. | 285/175 |
| 3,805,567 | 4/1974 | Agius-Sinerco | 285/381 X |
| 3,872,573 | 3/1975 | Nichols et al. | 285/381 X |
| 3,893,718 | 7/1975 | Powell | 285/382.2 X |
| 3,913,444 | 10/1975 | Otte | 85/8.3 |
| 4,035,007 | 7/1977 | Harrison et al. | 285/381 |
| 4,135,743 | 1/1979 | Hughes | 285/115 |

FOREIGN PATENT DOCUMENTS

| | | | |
|---|---|---|---|
| 2145831 | 3/1973 | Fed. Rep. of Germany | 285/381 |
| 2448160 | 5/1975 | Fed. Rep. of Germany | 285/381 |
| 2724178 | 12/1977 | Fed. Rep. of Germany | 285/381 |
| 979833 | 1/1965 | United Kingdom | 174/DIG. 8 |

*Primary Examiner*—Thomas F. Callaghan

[57] ABSTRACT

Arrangement for demountably sealing two concentric metallic tubes in an ultra high vacuum system which facilitates remote actuation. A tubular seal includes integral spaced lips which circumferentially engage the metallic tubes. The lips plastically deform the metallic tubes by mechanical forces resulting from a martensite to austenite transformation of the tubular seal upon application of a predetermined temperature. The sealing force is released upon application of another temperature which causes a transformation from the stronger austenite to the weaker martensite. Use of a dual acting sealing ring and driving ring circumferentially contacting the sealing ring is particularly applicable to sealing larger diameter concentric metallic members.

7 Claims, 17 Drawing Figures

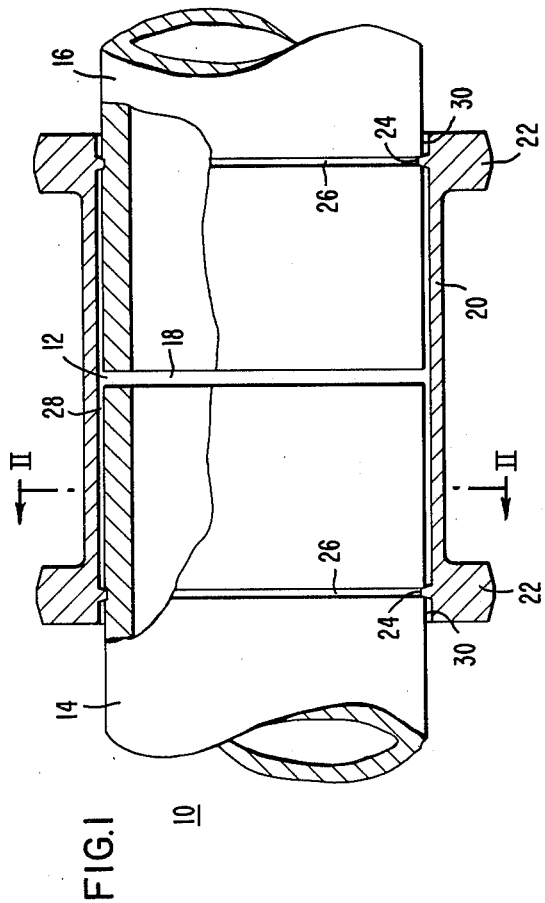
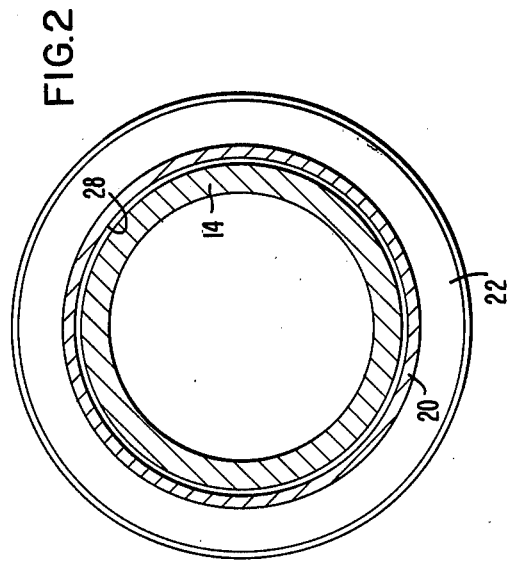
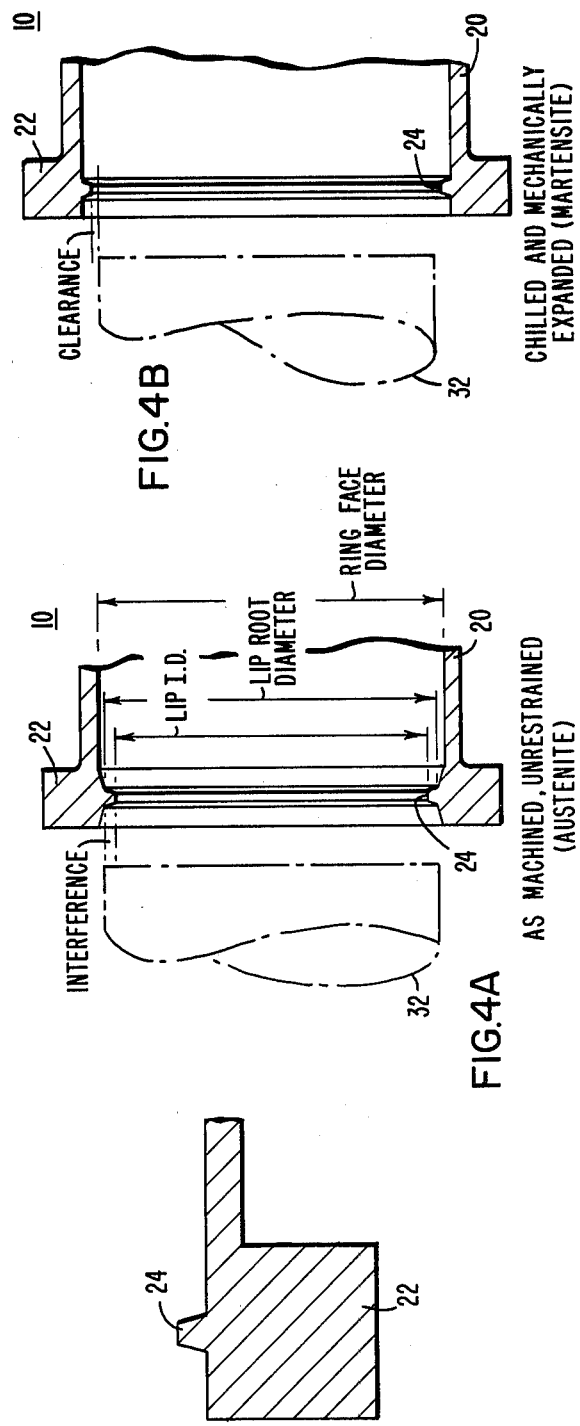

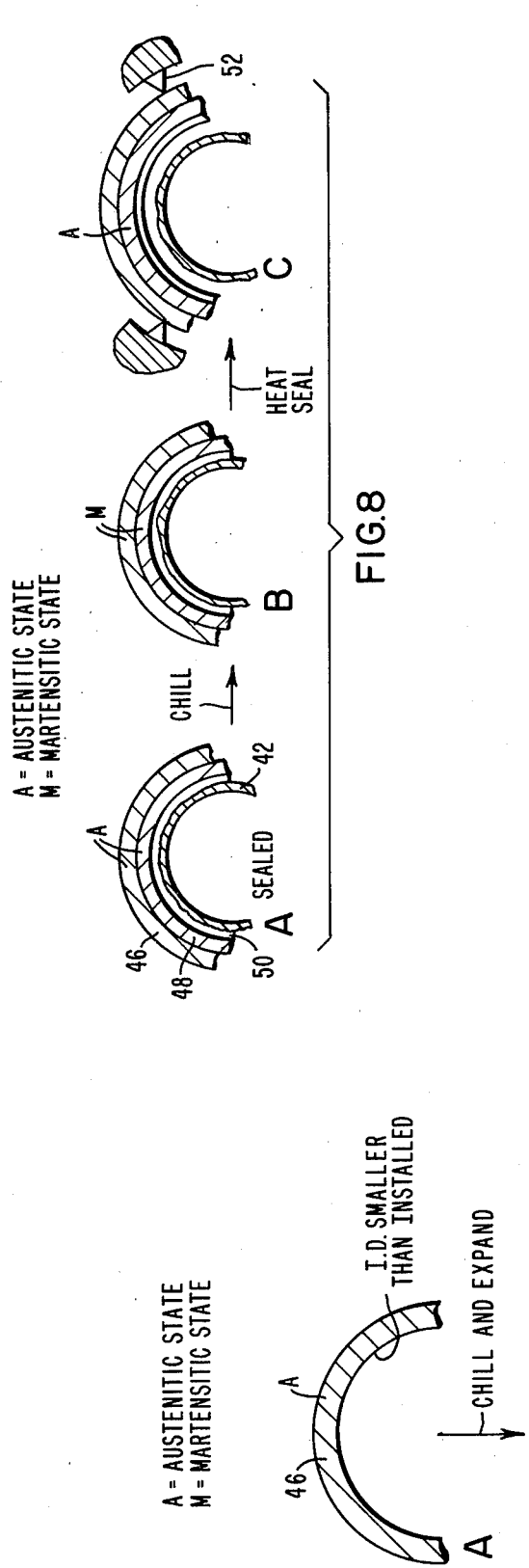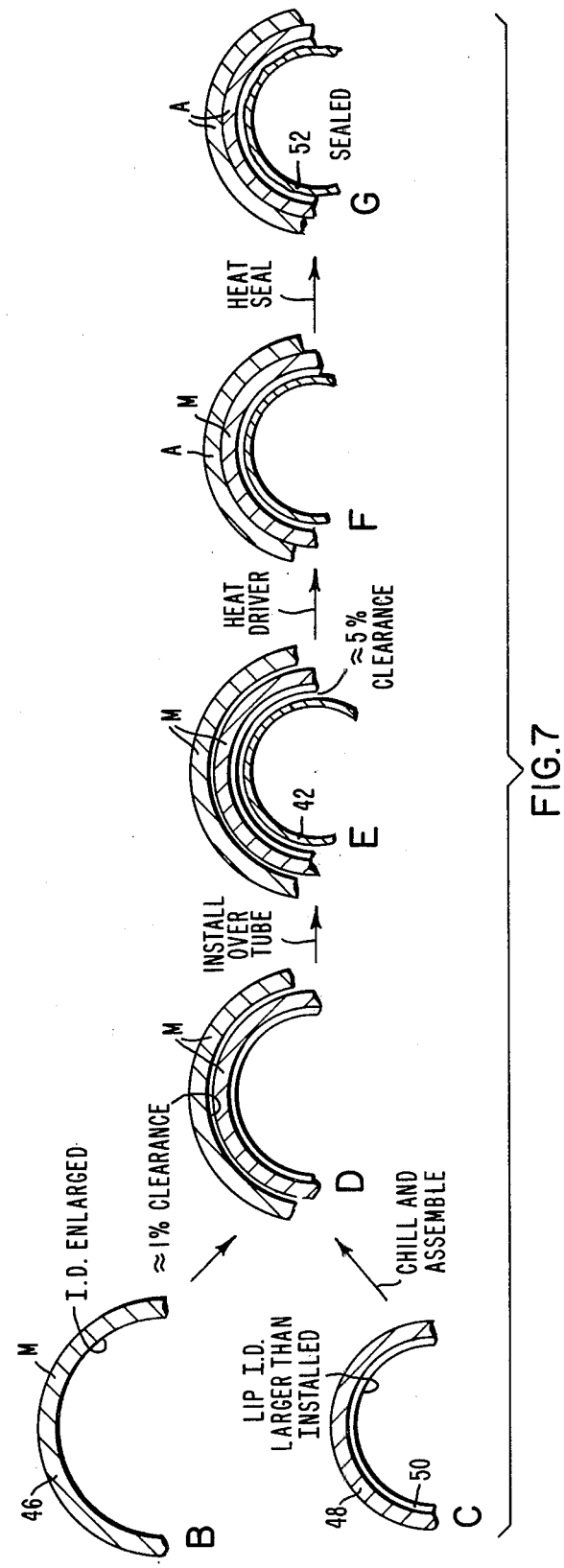

ULTRA HIGH VACUUM SEAL ARRANGEMENT

This invention was made or conceived in the course of or under contract No. E(11-1)-3073, Subcontract 192 with the United States Department of Energy.

CROSS REFERENCE TO RELATED APPLICATIONS

This disclosure is closely related to the following documents:

1. Concurrently filed U.S. patent application Ser. No. 891,791 in the name of C. Kim and R. Flaherty entitled O-Ring Sealing Arrangement For Ultra High Vacuum Systems which teaches sealing apparatus related to the apparatus disclosed herein.

2. U.S. Pat. No. 3,174,851 in the name of William J. Buehler et al., which provides background information on heat recoverable nickel-titanium alloys which can be utilized in the apparatus taught herein, which application is hereby incorporated by reference.

BACKGROUND OF THE INVENTION

1. Field of the Invention

This invention relates to ultra high vacuum systems, those operating in a pressure range below $10^{-6}$ torr, and specifically provides remotely actuatable removable seals for joining concentric tubes in such systems.

2. Description of the Prior Art

In assembling ultra high vacuum (UHV) systems, those systems operating at pressures below approximately $10^{-6}$ torr, seals and closures have presented challenging problems. For such systems, rubbers and elastomers are not suitable as seals as they are permeable to gases to an extent such that very low base pressures cannot be attained and such seals typically cannot survive the high temperatures often necessary to bake out vacuum systems. When frequent separation of a joint is not a requirement, multipass tungsten-inert-gas (TIG) or metal-inert-gas (MIG) welding is often preferred to a demountable closure. When frequent separation or proximity of heat sensitive materials makes welding impractical, plastically deformed metal seals are satisfactory. The seals, however, require very rigid flanges and many closely spaced bolts to accomplish a sufficiently tight seal, and assembly and disassembly are time consuming, especially if these operations must be performed remotely. Nevertheless, plastically deformed metal seals such as gold wire and flat copper washers are the most reliable seals and are used almost universally in UHV work. Many styles have been developed, from laboratory fabricated special seals to commercially available standardized seals. The successful UHV seals all have two characteristics in common; (1) at least one of the sealing surfaces is plastically deformed, and (2) there is no relative motion between the sealing surfaces.

It is desirable to provide a seal which possesses, in addition to these two characteristics, the ability for remote actuation, installation and removal.

Additionally, where it is necessary to demountably seal large cylindrical components in a UHV environment, for example, those having diameters of several feet or more, the operational concerns are magnified, particularly where remote assembly and disassembly are required. Separating forces between the seal and the UHV system components can be large as a result of the weight of the seal members, and can be beyond the capability of force-sensitive remote actuators or manipulators. The separating forces may, of necessity, be applied through complex structures such as piping, vacuum shells and expansion joints, which are made more costly, more complicted, and less reliable by this additional function imposed upon them. Further, the sealing surfaces may be severely damaged locally by sliding them while loaded by the dead weight of the bulky seal members. Resulting repair or replacement of the seal and component surfaces can be difficult, slow and costly because of the large size of the components involved.

In metallurgy there exists high strength metal alloys which exhibit unique "memory" characteristics when undergoing a transformation between martensitic and austenitic states. The alloys can, for example, be machined in a high temperature austenitic geometry, cooled through a phase transformation to a weaker martensitic state, deformed and, upon heating through the same phase transformation temperature range, return substantially to the original austenitic geometry. If restrained from returning to the original geometry the alloys develop internal stresses consistent with the strain between the original "remembered" geometry and the restrained configuration imposed upon the alloys.

Among the alloys exhibiting these characteristics are various combinations of gold and cadmium, copper and zinc, indium and thallium, copper and tin, as well as nickel and titanium, among others, the latter being commonly referred to as Nitinol which is commercially available from the Raychem Corporation. The nickel-titanium alloys also can incorporate smaller amounts of other elements. Alloys generally exhibiting memory characteristics are also referred to as "heat recoverable" since they require heat to effect the crystallographic phase transformation necessary to recover their shape. Additional detail regarding such nickel-titanium alloys is provided in the above-referenced Buehler patent.

Also available from the Raychem Corporation are Cryocon ® electrical connectors and Cryofit ® piping connectors, utilizing Nitinol alloys. The Cryofit connector is essentially a sleeve of Nitinol, having internal seal ridges in series, which is bored in the austenitic phase to a diameter less than the outside diameter of pipes to be joined, then chilled and transformed to martensite, and mechanically expanded to a diameter greater than the outside diameter of pipes to be joined. The connector can be slipped over the pipes, heated and transformed to austenite, whereby a hoop stress presses the series of seal ridges into the outer surfaces of the pipes making an excellent pipe and hydraulic connection. The ridges, however, while forming a seal, are inconsistent with UHV applications, and may locally deform the joined pipes to a degree inconsistent with reuse of the connector for substantial sealing. Seal surfaces in series also raise concerns regarding virtual leaks.

It is accordingly desirable to provide a sealing arrangement for application to large UHV system components which does not require mechanical actuators and which can be remotely installed, actuated, released and returned approximately to its pre-installation configuration having sufficient clearance to facilitate removal and replacement without damage to the seal or the system components.

SUMMARY OF THE INVENTION

This invention provides sealing arrangements and methods for fabricating and installing reusable seals which reliably perform in an ultra high vacuum (UHV) system and provide for simplified remote installation, actuation and removal. A seal in accordance with one embodiment of the invention includes a tubular ring of a heat recoverable alloy which extends across the juncture of two concentric metallic tubes in a UHV system. Integrally formed with the ends of the tubular ring are reacting rings of enlarged cross section. Also integrally formed with the tubular and reactings rings are seal lips, of smaller cross section than the reacting rings, formed circumferentially with respect to the reacting rings. The circumferential lips can be oriented either within or about the reacting rings dependent upon whether the seal is respectively disposed externally or internally of the concentric tubes. The following description and examples refer primarily to seals disposed externally about the metallic tubes to be sealed, although it is to be understood that internal seals are equally possible.

The seal is machined to the described configuration in its austenitic state. Subsequently the seal is cooled below its transformation temperature range which transforms it to martensite. Martensite exhibits lower strength characteristics than the austenite. The seal, in the martensitic state, is then placed in a die and diametrically expanded, such as by hydraulic or other known methods, into contact with a specifically sized die. The tubes to be joined are inserted into the tubular seal to a selected depth, and the seal is heated, remotely or otherwise, through the transition temperature range so as to return it to the stronger "remembered" austenitic state. The circumferential lips exert sufficient force to plastically deform the concentric metallic tubes, forming a reliable UHV seal.

For disassembly of the joint, the seal is again cooled below its transition temperature such that it becomes stress-free martensite at its existing dimensions, and relieves the sealing force upon the tubes. The tubes can then be slid apart. The keying effect of the martensitic lip in the annular grooves of the plastically deformed metallic tube can be alleviated by differentially cooling the metallic tube to release the interference and provide clearance for disassembly. The tubular seal can be stored in its cold martensitic condition and subsequently re-expanded and re-installed, the processes and transformations being repeatable to a degree consistent with such reusable application.

In another embodiment, a double-acting tubular seal is utilized. As utilized for external application, the seal includes two concentric rings, the outer ring having a slightly greater cross section than the inner ring. Both rings are made of an alloy as discussed above. The outer, or driver ring, is machined in the austenitic condition to an inside diameter approximately five percent smaller than its installed inside diameter. It is chilled to transform it to martensite and then expanded, hydraulically or otherwise, approximately ten percent. The inner, or sealing ring, is machined in the austenitic condition with a circumferential seal lip approximately five percent larger than the outside diameter of the tubes to be sealed. The outside diameter of the sealing ring is machined to be slightly smaller, for example, a fraction of one percent, than the inside diameter of the driver ring. The sealing ring is chilled to transform it to martensite, then fitted inside the driver ring. The assembly can be stored in the chilled martensitic condition until it is to be installed.

At installation the seal assembly is slipped over the ends of the tubes, with about five percent total clearance. The sealing ring is kept chilled, in the martensitic state, while the driver ring is heated, transforming it to the austenitic state so that the driver compresses the sealing ring about five percent, forcing contact of the seal lips with the tubes. The sealing ring and lip are then heated and transformed into the higher strength austenite. A contraction of the driver ring continues and loads the sealing ring. It continues to compress the sealing ring until fully transformed, thereby plastically deforming the tubes circumferentially at the contact of the lip and tube.

In the sealed configuration, both the sealing ring and driver ring are austenitic. The hoop tension force in the driver ring is sufficiently great, because of its greater cross section, to offset the hoop compression force in the sealing ring and still provide a radially inward load on the seal lip.

To disassemble the seal, both rings are chilled into the martensitic state. The roles of the driver and sealing rings are now reversed. The inner ring is warmed and transformed to austenite first, stretching the outer ring while it is still in the low strength martensitic condition. The pair of rings thus return to approximately their pre-installation dimensions, except that the initial assembly clearance between them has disappeared. The seal lip diameter is now approximately five percent greater than the outside diameter of the tube end. By cradling the driver ring at, for example, three points on a circle less than five percent eccentric from the tubes, there will be no contact between the sealing ring and the tube end. The seal assembly can be re-installed in the same manner in which the original installation was made if the tube rings are kept in the martensitic state until re-installation takes place.

BRIEF DESCRIPTION OF THE DRAWINGS

The advantages, nature and additional features of the invention will become more apparent from the following description, taken in connection with the accompanying drawings, in which:

FIG. 1 is a partial-section view of an ultra high vacuum (UHV) seal in accordance with one embodiment of the invention in the operating configuration;

FIG. 2 is a view taken at II—II of FIG. 1;

FIG. 3 is a cross-section view of a portion of the seal of FIG. 1 in an as-machined, uninstalled condition;

FIG. 4A is a partial-section view of a UHV seal in an as-machined configuration;

FIG. 4B is a partial section view of a UHV seal in an as mechanically expanded orientation;

FIGS. 7A through 7G schematically illustrate the assembly and installation procedure of the seal of FIG. 5;

FIGS. 8A through 8C schematically illustrate the disassembly procedure of the seal of FIG. 7G;

DESCRIPTION OF THE PREFERRED EMBODIMENTS

Figure 6:
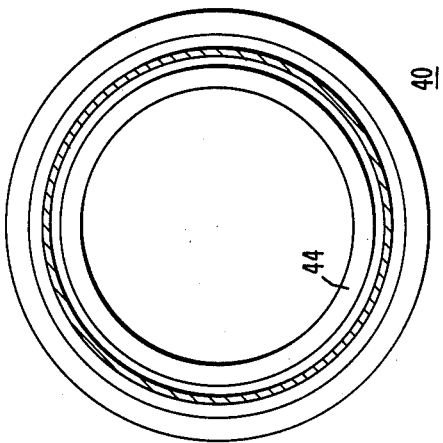
FIG. 6 is a view taken at VI—VI of FIG. 5.

Referring now to FIGS. 1 and 2 there is shown an ultra high vacuum (UHV) seal 10 in the operating orientation, sealing the juncture region 12 of two concentric tubes 14 and 16. Concentric, as used throughout the specification and the appended claims, refers to plural tubular components having axial center lines which are longitudinally aligned, either directly upon each other or through extensions of each. The tubular components, therefore, may abut one another, be partially contained one within the other, or spaced from one another. An example of the latter, the spaced orientation, is shown in FIGS. 1 and 2, a space 18 separating the tubes 14 and 16.

The seal 10 is preferably made of an alloy comprised of nickel and titanium, having high strength and the unique "memory" characteristics described above and well known in the art. It should be recognized that the various alloys, hereinafter referred to as Nitinol and as heat recoverable, can be provided with a transition temperature range compatible with, that is, sufficiently above or below, the operating temperature of the specific UHV system to which the seal is to be applied. A typical exemplary Nitinol alloy is composed of fifty-five weight percent nickel and forty-five percent titanium.

The seal 10 is an integral structure which includes a tubular membrane 20 and two reacting rings 22, each reacting ring having a circumferential protruding seal lip 24. The integral seal 10 can be roughly formed, heated to above its transition temperature range, and machined in the stronger austenitic state. The reacting rings are initially machined to preferably a rectangular cross section, as shown in FIG. 3, and are of larger cross-sectional area than the membrane 20. After machining the seal 10 is cooled below its transformation temperature range, thereby being transformed to martensite of relatively low strength. From the inside, the seal is then expanded to an inside diameter larger than the tubes 14, 16 outside diameter, through, for example, hydraulic or other means known in the art, into contact with a specifically sized die which is preferably chilled. A split-ring die can beneficially be utilized during this expansion to support the membrane 20 of the seal 10. The seal, so-fabricated, can be stored in the martensitic condition until it is to be installed.

For installation, the tubes 14, 16 to be joined are inserted into the seal 10. The depth for insertion can be varied; however, the membrane 20 should be sufficiently long and the insertion sufficiently deep to avoid buckling of the end of a tube 14, 16 upon application of pressure by the seal 10. Alternatively, the tube ends can be reinforced. Additionally, as discussed further below, a space 12 between the tube 14, 16 ends is desirable to avoid virtual leaks. Subsequent to insertion the seal is heated through its transition temperature range. The lips 24 are accordingly circumferentially contacted with the tubes and then loaded as the seal 10 transforms to its austenitic phase and tends towards its austenitic free configuration. The loading, resulting from the energetic dimensional and stress changes of the martensite to austenite transformation, is sufficient to plastically deform the tubes 14, 16 as shown by the circumferential grooves or ridges 26. The loading also causes deformation of the reacting rings 22 from the configuration shown in FIG. 3 to the configuration shown in FIGS. 1 and 2.

The installed configuration shown also alleviates the possibility of virtual leaks, since there is only one sealing area on each of the tubes being sealed. Gas trapped between seals in series may slowly escape to a UHV system, becoming a virtual leak which is very difficult to locate, and such possibilities are eliminated in the arrangement shown. In the disclosed arrangement, the annular channel 28 leading to each seal lip from the vacuum side is open to permit rapid pumping of this volume and prompt detection of a tracer gas if a seal leak exists. The channel 30 leading to the seal from the atmospheric side is also open to permit easy introduction of a tracer gas to the sealed areas.

To disassemble the joint, the seal 10 is again cooled below its transition temperature, so as to become stress-free martensite at its existing dimensions. The joint can then be slid apart, unless the keying effect of the seal lips 24 in the plastically deformed annular ridges 26 is substantially resistive. In that event, differentially cooling the stainless steel tubes will release the interference, and further cooling will provide clearance for disassembly. This can be performed merely by passing a cold liquid through the interior of the tubes.

EXAMPLE

The left-hand portion of FIG. 4 shows a specific seal 10 in the as-machined austenitic condition, and the right-hand portion shows the same seal in its chilled and mechanically expanded martensitic condition, prior to installation. The seal forms a joint between two sections of 3 inch O.D., AISI305 stainless steel tubing 32 with 0.3 inch thick walls.

The seal lips 24 are 1/16 inch wide. With a seal load of 4,000 pounds per lineal inch of seal, the surface compressive strength between the lips is 64,000 psi which is approximately the yield strength of AISI 305 stainless steel following 15 percent cold reduction, and is within the safe loading limits for this material.

A seal load of 4,000 pounds per lineal inch is chosen for exemplary purposes since testing of hydraulically loaded prior art seals has shown that a force of 2,500 pounds per inch of seal length causes sufficient plastic deformation to make a consistent seal between stainless steel and "hard" copper. The soft component of this prior art seal is the copper, 87-108 BHN. In a seal between AISI 305, 80$R_B$ and Nitinol, 79.5$R_B$ there is no soft component, both surfaces being approximately 144 BHN (Brinnell hardness number). Deformation with the exemplary seal equivalent to that in the copper-stainless steel combination will occur when the load is about 4,000 pounds per lineal inch, i.e., when the load is scaled upward in proportion to the Brinnell hardness.

For pipes 32 with unstiffened ends, the distance between the seal lips is preferably slightly greater than twice the characteristic attenuation length (l) of the pipe, defined as $$l = 5\pi/4\lambda \tag{1}$$

Where the wavelength $\lambda$ in the exemplary tubing 32 is $$\lambda = \sqrt[4]{\frac{3(1-\nu^2)}{R^2 t^2}} = 2.02 \text{ reciprocal inches} \tag{2}$$

R̄ is the tube inside radius, t is the tube wall thickness and ν is Poissons ratio. The seal rings are therefore spaced approximately 4.1 inches ($2 \times 5\pi/4\lambda$) apart. For pipes with inconveniently long attenuation length, external or internal stiffening rings can advantageously be added to the tubes 32. Such stiffening rings should be proportioned to resist collapse as elastically unstable rings if they are loaded radially inward.

The radial displacement inward of the pipe wall as a result of seal loading must be small compared with the restrained cold deformation of the Nitinol reacting rings to maintain the radial force which in this instance is 0.575 inches radially. The radial displacement of the tube wall is $$\Delta R = -pR^2\lambda/2Et = 0.000846 \text{ inch} \quad (3)$$

where p is the pressure between the seal ring and tube surface, R is the pipe initial external radius, and E is the modulus of elasticity of the pipe metal. Accordingly, the Nitinol ring has an unresolved deformation of 0.0567 inch. This radial displacement is 1.47 percent of the restrained radial cold deformation.

The Nitinol reacting ring 22 is assumed to be restrained at 104 percent of its free diameter at the seal lip (about 50,000 psi stress) but unrestrained at its faces. The stress distribution across the ring cross section is assumed to be linear, so that the mean stress is 25,000 psi. The cross section of the reacting ring is, in this example, square. Thus, from a force balance on the ring where $F=pD$ and $A=2t^2$, the ring thickness is approximately one-half inch. Other nearly square rectangular shapes can be used if desirable to provide clearance with respect to other components, to use available stock sizes or to conserve Nitinol.

The Nitinol reacting ring is assumed to be machined at 100 percent of its free diameter, to be stretched to 109 percent, to spring back to 108 percent and at the seal to be restrained at 104 percent, which is 3.000 inches. These dimensions at the inside diameter of the seal lip are:
  Machined: 2.885
  Stretched: 3.144
  Relaxed: 3.115
  Reacted (4% strain): 3.000
At the roots of the seal lips, these dimensions are:
  Machined: 3.005
  Stretched: 3.275
  Relaxed: 3.245
  Reacted (4% strain): 3.125
And, at the faces of the reacting rings, which are not restrained, these diameters are:
  Machined: 3.125
  Stretched: 3.406
  Relaxed: 3.375
  Reacted (zero strain): 3.125

The Nitinol membrane 20 which connects the reacting rings and is integral with them has the same dimensions as the faces. The thickness of this membrane can be varied, and in this example is set at ⅛ inch.

For the expansion operation, a 4.406 I.D. die would be utilized (3.406+2×0.5 inches). The strength of the martensitic Nitinol is relatively low for small deformations up to about 10 percent, and the desired 9 percent strain can be reached with a corresponding stress of approximately 10,000 psi. The pressure required to achieve the desired strain by typical hydraulic means is less than 3,000 psi. While a split ring die or other supportive means may be desirable to support the thinner membrane 20 during expansion, such support may be unnecessary since martensitic Nitinol is elastic between about 10,000 psi and 150,000 psi, and the stress in the membrane under the exemplary conditions reaches approximately 40,000 psi.

Regarding the keying effect at disassembly, if the contact between the seal lip 24 and tube 32 is approximated as a cylinder upon a flat plate, the width of the contact is calculated to be 0.0083 inch and the groove depth is 0.00024 inch. Therefore, even if this depth is all plastic flow and the groove this deep, differentially cooling the stainless steel by approximately 18° F., such as by passing a cool fluid through the tube 32, will release interference and further cooling provides clearance.

Figure 5:
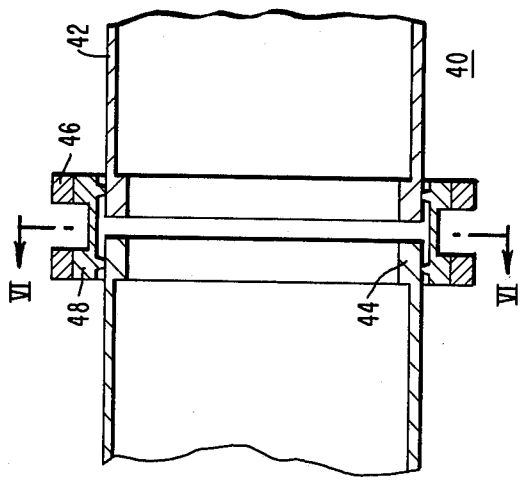
FIG. 5 is a sectional view of a double-acting UHV seal in accordance with another embodiment.

A double-acting Nitinol seal assembly 40, particularly suited to sealing large components with diameters of several feet or more, is shown in FIGS. 5 and 6 in an operating configuration, and the fabrication and installation sequence is schematically illustrated in FIGS. 7A through 7G. The vacuum tubes 42 are shown in FIGS. 5 and 6 with enlarged closure rings 44 to provide additional tube support.

The seal assembly 40 includes two concentric rings, the outer ring having a greater cross section than the inner ring. Both rings are made of Nitinol. The outer, or driver ring 46, is machined in the austenitic condition to an inside diameter approximately 5 percent smaller than its installed inside diameter (FIG. 7A). It is chilled to transform it to martensite and then expanded, hydraulically or otherwise, approximately 10 percent (FIG. 7B). The inner, or sealing ring 48, is machined in the austenitic condition with a seal lip 50 I.D. approximately 5 percent larger than the outside diameter of the tube 42 end. The outside diameter of the sealing ring 48 is machined to be slightly smaller than the inside diameter of the driver ring to facilitate initial assembly of the two rings (FIG. 7C). The sealing ring 48 is chilled to transform it to martensite and then fitted inside the driver ring (FIG. 7D). The assembly can be stored in the martensitic condition until it is to be installed.

At installation the seal assembly 40 is slipped over the tube end (FIG. 7E) with about 5 percent total clearance. The sealing ring is kept chilled by means such as insulation or convection cooling, while the driver ring compresses it about 5 percent, forcing contact of the seal lip with the tube (FIG. 7F). The seal lip 50 is then heated and transformed into the higher strength austenite by warming, such as by contact with the unchilled tube end. The contraction of the driver ring continues and loads the seal between the lip and tube. The contraction continues to compress the sealing ring until it is fully transformed and plastically deforms 52 the tube 42 (FIG. 7G).

During service, both the sealing ring 48 and driver ring 46 are austenitic. The hoop tension force in the driver ring is sufficiently great, because of its greater cross section, to offset the hoop compression force in the sealing ring and still provide a radially inward load on the seal lip of, for example, 4,000 pounds per lineal inch, which will result in a plastically deformed metal UHV seal.

To disassemble the seal (FIG. 8A), both rings 46, 48 are chilled into the martensitic state (FIG. 8B). The roles of the driver and sealing rings are now reversed. The inner ring 48 is warmed and transformed to austenite first, stretching the outer ring 46 while it is still in the low strength martensitic condition. The pair of rings thus return to approximately their pre-installation dimensions, except that the initial assembly clearance between them has disappeared (FIG. 8C). The seal lip 50 diameter is now approximately 5 percent greater than the outside diameter of the tube end. If the driver ring is cradled 52 at three points on a circle less than approximately 5 percent eccentric from the tube 42 end, there will be no contact between the seal ring and the tube end.

The seal assembly can be stored, inspected and subsequently re-installed in the same manner in which the original installation was performed by maintaining the two rings in the martensitic state until re-installation takes place. The driver ring can include two separate rings as shown in FIG. 5, or can be of other configurations such as a single ring of constant cross section or two enlarged rings joined by a membrane.

EXAMPLE

Figure 9:
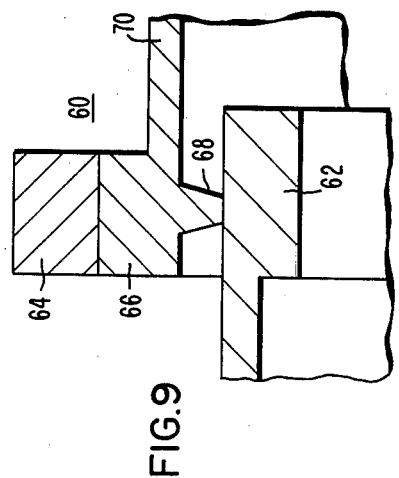
FIG. 9 is a sectional view of an exemplary UHV seal in accordance with the invention.

FIG. 9 shows a double-acting Nitinol seal 60 sized for the closure of the Tokamak Fusion Test Reactor (TFTR) vacuum vessel. The vessel closure ring is large, having an I.D. of 88.5 inches and an O.D. of 94.5 inches, and is designed to resist collapse under a seal load of 4,000 pounds per lineal inch of seal length, with a safety factor of three; the radial thickness of this ring is limited to 3 inches by internal and external clearance requirements of the vacuum vessel, and its cross-sectional length in accordance with equations (1) and (2) is therefore 5.3 inches.

When the seal 60 is closed, the driver ring 64 is contracting inward to produce the seal load and to restrain the sealing ring, which is expanding outward. As an upper limit in size, it is assumed that these three forces are approximately equal. For a stress of 50,000 psi and a square driver plus sealing ring cross section:

$$(3\times 4{,}000)/(2lt)\times 94.5 = 50{,}000 \text{ psi}$$

$$l = t = 3.36 \text{ inches}$$

The cross section of the driver ring 64 is larger than the cross section of the sealing ring 66 and, for an exemplary 2:1 area ratio this material is distributed as a seal ring 1.12 inch thick×96.7 O.D., with a 0.25×0.25 contoured seal lip 68 on the inner diameter, and a driver ring 2.24 inch thick×96.7 inch I.D., 101.2 inch O.D. in the sealed configuration. The membrane 70 thickness is 0.25 inch.

When the seal 60 is opened, the austenitic sealing ring 66 presses outward against the driver ring 64 exerting a radial force resisted by the strength of the martensitic driver ring. Equilibrium is reached when the radial inward pressure of the larger low strength martensite band equals the radial outward pressure of the smaller austenite band, in which the compressive stress is decreasing as it expands. For the exemplary 2:1 area ratio of the rings, deformation stress of 10,000 psi for the martensite phase, and a modulus of elasticity of $12.5 \times 10^6$ psi for the austenite phase, equilibrium will occur at 0.16 percent strain of the austenite. The initial clearance between the seal ring and the closure ring, approximately 5 percent of the closure ring diameter, is 97 percent recovered. If the seal is transformed to martensite, such as for storage and reapplication, it is initially unstressed martensite in a ring of stressed martensite. Further contraction will occur as a new force equilibrium is reached. The modulus of elasticity of the martensite phase is approximately $2 \times 10^6$ psi, and therefore the rings contract 0.3 percent, equal to approximately 6 percent of the initial clearance. Thus the seal ratchets inward 9 percent of the installation clearance with each cycle of use and, after seven cycles, 52 percent of the original installation clearance is still available.

Figure 10:
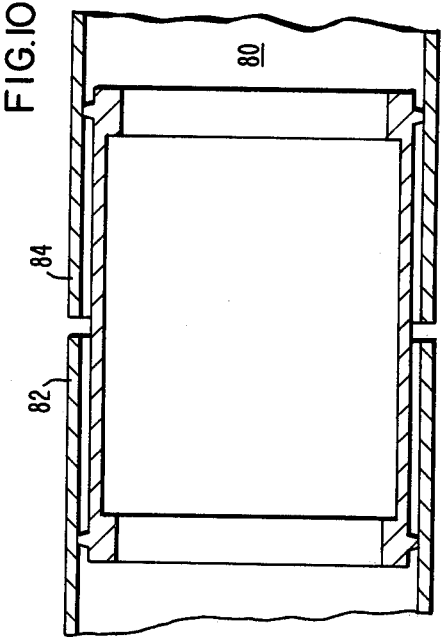
FIG. 10 is a sectional view of a UHV seal disposed internally of two tubes in a UHV system.

There have been described several specific configurations for UHV seals and methods for fabricating and installing the same. It will be recognized that alternative geometric configurations can be utilized. For example, the seal lip can be configured with a flat bottom, in a wedge shape, as a truncated wedge, and rounded, among other configurations. Additionally, all available grades of Nitinol can be utilized, differing primarily in the transformation temperature range of each. Further, rings of various dimensions operating to apply forces to each other and the components to be sealed can be arranged. Specifically, seals can be placed internally of the components as shown in FIG. 10, wherein a seal 80 is disposed within two concentric metallic tubes 82, 84. Many additional alternatives are possible. It therefore is to be understood that within the scope of the appended claims the invention can be practiced other than as specifically described.

I claim:

1. Apparatus for removably sealing two concentric longitudinally aligned metallic tubes in an ultra high vacuum system comprising:
a tubular seal formed of a heat recoverable metallic material having integrally formed reacting rings of enlarged cross section near the ends thereof, said reacting rings extending radially outward from the balance of said tubular seal, each said ring having associated therewith an integral protruding circumferential lip, each said lip extending radially inward from the balance of said seal in longitudinal alignment with a corresponding ring, said seal sized such that one of said lips circumferentially contacts one of said concentric tubes upon transformation from a martensitic to austenitic state with a pressure sufficient to plastically deform said one tube and another of said lips circumferentially contacts the other of said tubes upon said transformation with a pressure sufficient to plastically deform said other tube.

2. The apparatus of claim 1 wherein said heat recoverable material is an alloy comprising nickel and titanium.

3. The apparatus of claim 2 wherein said concentric tubes have similar outside diameters and said lips circumferentially contact said outside diameters.

4. The apparatus of claim 3 wherein there are two lips, said concentric tubes are longitudinally spaced from one another, and wherein the annular area bounded by said lips, the inner side of said tubular seal between said lips, and the outside diameter of said concentric tubes between said lips is in fluid communication with said space, whereby virtual leaks between said two lips are eliminated.

5. Apparatus for removably sealing two concentric longitudinally aligned metallic tubes in an ultra high vacuum system comprising:
(a) a tubular ring of a heat recoverable metallic material having integrally formed sealing rings of enlarged cross section near the ends thereof, said rings each having an integral protruding circumferential lip, said sealing rings sized such that one of said lips circumferentially contacts one of said concentric tubes while in an austenitic state and another of said lips circumferentially contacts the other of said concentric tubes while in an austenitic state, and (b) a tubular driver ring of a heat recoverable metallic material and of larger cross section than said sealing rings, said driver ring sized to circumferentially contact one of said sealing rings on the side of said sealing ring opposite said lip while said driver and sealing rings are both in an austenitic state with sufficient pressure such that the sum of the forces among said driver ring, sealing ring and tubes circumferentially and plastically deforms said tubes.

6. The apparatus of claim 5 wherein the ratio of cross sectional area of said driver ring to said sealing ring is approximately 2:1.

7. The apparatus of claim 5 wherein said heat recoverable material in an alloy of nickel and titanium.

* * * * *